(12) United States Patent
Bellessort et al.

(10) Patent No.: US 9,361,391 B2
(45) Date of Patent: Jun. 7, 2016

(54) METHOD OF GENERATING A WEB FEED AND AN ASSOCIATED SYSTEM

(75) Inventors: Romain Bellessort, Rennes (FR); Youenn Fablet, La Dominelais (FR); Hervé Ruellan, Rennes (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 1170 days.

(21) Appl. No.: 12/940,540

(22) Filed: Nov. 5, 2010

(65) Prior Publication Data
US 2011/0107199 A1 May 5, 2011

(30) Foreign Application Priority Data

Nov. 5, 2009 (FR) ...................................... 09 57850

(51) Int. Cl.
*G06F 17/00* (2006.01)
*G06F 17/30* (2006.01)
*H04L 29/08* (2006.01)

(52) U.S. Cl.
CPC ............ *G06F 17/3089* (2013.01); *H04L 67/02* (2013.01); *H04L 67/26* (2013.01)

(58) Field of Classification Search
CPC .......... G06F 17/3089; G06F 17/30864; G06F 17/30867; G06F 17/30899; G06F 17/30905; H04L 67/02; H04L 67/26; H04L 12/1859
USPC .......... 715/201, 205, 209, 234; 709/203, 206, 709/217, 219, 224; 707/E17.014, E17.108, 707/999.003
See application file for complete search history.

(56) References Cited

U.S. PATENT DOCUMENTS

| | | | |
|---|---|---|---|
| 6,807,558 B1 * | 10/2004 | Hassett et al. | 709/203 |
| 7,171,687 B2 * | 1/2007 | Uemura | 726/18 |
| 7,590,691 B2 * | 9/2009 | Gonsalves et al. | 709/205 |
| 7,958,125 B2 * | 6/2011 | Yan et al. | 707/737 |
| 8,001,005 B2 * | 8/2011 | Pitkow et al. | 705/14.73 |
| 8,255,521 B1 * | 8/2012 | Natarajan et al. | 709/224 |

(Continued)

FOREIGN PATENT DOCUMENTS

WO 2007/044722 4/2007

OTHER PUBLICATIONS

U.S. Appl. No. 12/940,545, filed Nov. 5, 2010.

(Continued)

*Primary Examiner* — Cesar Paula
*Assistant Examiner* — James H Blackwell
(74) *Attorney, Agent, or Firm* — Fitzpatrick, Cella, Harper & Scinto (57) ABSTRACT

The invention relates to generating a web feed composed of content elements. A number of content elements to be added to the web feed is determined, according to a number of available content elements to be published and according to a predefined visibility period associated with the web feed and defining a minimal time period for which any content element has to remain present in the web feed, wherein the determining of the number of elements comprises estimating a predicted number of new content elements liable to arrive during said visibility period, from historical data of said web feed representing statistics of arrivals, during past visibility periods, of content elements to be published. From the number of available content elements to be published, the determined number of content elements are selected, and entries corresponding to the selected content elements are created in the web feed.

21 Claims, 7 Drawing Sheets

(56) References Cited

U.S. PATENT DOCUMENTS

| | | | |
|---|---|---|---|
| 8,341,513 B1* | 12/2012 | Lattyak et al. | 715/229 |
| 8,458,039 B1* | 6/2013 | Schuster et al. | 705/26.1 |
| 2005/0038717 A1* | 2/2005 | McQueen et al. | 705/27 |
| 2005/0165615 A1* | 7/2005 | Minar | 705/1 |
| 2006/0167749 A1* | 7/2006 | Pitkow et al. | 705/14 |
| 2006/0173985 A1 | 8/2006 | Moore | 709/223 |
| 2006/0217126 A1* | 9/2006 | Sohm et al. | 455/454 |
| 2006/0288011 A1* | 12/2006 | Gandhi et al. | 707/10 |
| 2006/0288329 A1* | 12/2006 | Gandhi et al. | 717/114 |
| 2007/0038567 A1* | 2/2007 | Allaire et al. | 705/50 |
| 2007/0038712 A1* | 2/2007 | Affronti et al. | 709/206 |
| 2007/0061711 A1* | 3/2007 | Bodin et al. | 715/523 |
| 2007/0083520 A1* | 4/2007 | Shellen et al. | 707/10 |
| 2007/0094390 A1 | 4/2007 | Nussey | 709/225 |
| 2007/0130589 A1* | 6/2007 | Davis et al. | 725/62 |
| 2007/0156809 A1* | 7/2007 | Dickinson et al. | 709/203 |
| 2007/0245020 A1* | 10/2007 | Ott | 709/225 |
| 2007/0294646 A1* | 12/2007 | Timmons | 715/864 |
| 2008/0086689 A1* | 4/2008 | Berkley et al. | 715/731 |
| 2008/0155112 A1* | 6/2008 | Ma et al. | 709/231 |
| 2008/0201449 A1* | 8/2008 | Huang et al. | 709/218 |
| 2009/0228774 A1* | 9/2009 | Matheny et al. | 715/201 |
| 2009/0327320 A1* | 12/2009 | Yan et al. | 707/101 |
| 2010/0083124 A1* | 4/2010 | Druzgalski et al. | 715/738 |
| 2011/0022949 A1* | 1/2011 | Hallman et al. | 715/255 |

OTHER PUBLICATIONS

Ian Garcia, et al., "Eliminating and Less-Informative RSS News Articles Based on Word Similarity and a Fuzzy Equivalence Relation", 18th IEEE Conference, Nov. 1, 2006, pp. 465-473.

French Preliminary Search Report dated May 12, 2010 issued during prosecution of related French application No. FR 0957850.

* cited by examiner

```
<?xml version="1.0"?>
<rss version="2.0">
    <channel>
        <title>Liftoff News</title>
        <link>http://liftoff.msfc.nasa.gov/</link>
        <description>Liftoff to Space Exploration.</description>
        <language>en-us</language>
        <pubDate>Tue, 10 Jun 2003 04:00:00 GMT</pubDate>
        <lastBuildDate>Tue, 10 Jun 2003 09:41:01 GMT</lastBuildDate>
        <docs>http://blogs.law.harvard.edu/tech/rss</docs>
        <generator>Weblog Editor 2.0</generator>
        <managingEditor>editor@example.com</managingEditor>
        <webMaster>webmaster@example.com</webMaster>
        <item>
            <title>Star City</title>
            <link>http://liftoff.msfc.nasa.gov/news/2003/news-starcity.asp</link>
            <description>How do Americans get ready to work with Russians aboard
the International Space Station? They take a crash course in culture, language
and protocol at Russia's <a
href="http://howe.iki.rssi.ru/GCTC/gctc_e.htm">Star
City</a>.</description>
            <pubDate>Tue, 03 Jun 2003 09:39:21 GMT</pubDate>
            <guid>http://liftoff.msfc.nasa.gov/2003/06/03.html#item573</guid>
        </item>
    </channel>
</rss>
```

Figure 1a

```
<?xml version="1.0" encoding="utf-8"?>
<feed xmlns="http://www.w3.org/2005/Atom">

<title>Example Feed</title>
  <link href="http://example.org/"/>
  <updated>2003-12-13T18:30:02Z</updated>
  <author>
    <name>John Doe</name>
  </author>
  <id>urn:uuid:60a76c80-d399-11d9-b93C-0003939e0af6</id>

<entry>
    <title>Atom-Powered Robots Run Amok</title>
    <link href="http://example.org/2003/12/13/atom03"/>
    <id>urn:uuid:1225c695-cfb8-4ebb-aaaa-80da344efa6a</id>
    <updated>2003-12-13T18:30:02Z</updated>
    <summary>Some text.</summary>
  </entry>

</feed>
```

METHOD OF GENERATING A WEB FEED AND AN ASSOCIATED SYSTEM

This application claims priority from French patent application No. 0957850 of Nov. 5, 2009, which is incorporated herein by reference.

FIELD OF THE INVENTION

The present invention concerns a method of generating a web feed and an associated system.

BACKGROUND OF THE INVENTION

Web feeds, in particular of the syndication type, are widely used on the internet in particular in order to inform users on contents available (summary of articles published on the website), to advise them of the updating of content (photographs, software upgrades, etc) on a website or to deliver structured information such as weather forecasts. These feeds are generally published by the website in question and accessible to users who have subscribed to these feeds, through in particular a web feed aggregator or a web feed reader.

Web feeds take the form of a document, generally based on the XML ("eXtensible Markup Language") format, defining, in a first part, a set of properties relating to this feed (for example its name, the address at which it can be found, or the date of last update) and then, in a second part, a set of entries associated with the contents.

Each web feed entry describes content elements (or "items") by means of unique identifier within the web feed and information relating to the content: for example, a publication date, a title, possibly a summary and other details. Thus each entry represents one or more content elements (article, photograph, etc) published on one or more web feeds.

Because these web feeds are written in a standard XML format intended to describe the publication of a content, web feeds can easily be processed by applications, unlike HTML ("HyperText Markup Language") files, which are viewed in a web browser when an internet site is consulted.

Applications have thus been able to come into being, for example the one by means of which an internet site automatically displays, on its own pages, a summary of the contents published on another website. By virtue of the web feed, this application has become easy to set up since it consists, for the first internet site, of simply recovering the web feed from the other site by a conventional subscription and thus obtaining a summary of the contents of the other site.

In addition, the establishment of feed readers offers many possibilities for the user. A feed reader is a program to which the user will indicate certain web feeds to be monitored. This is what is called subscribing to a web feed.

The reader is then responsible for periodically recovering the web feed for the purpose of determining whether updates have been made. Where applicable, the web feed can indicate to the user, for example by means of a specific display, that new data are available.

The reader can also directly display the web feed as periodically recovered, thus offering applications of the weather, stock exchange, latest news etc type).

An appreciable advantage of the web feed is that, by subscribing, the user no longer needs to go to each site in order to check where the updates have been made. This is because it suffices for him to consult his web feed and, if some updates interest him, he can then go to the site concerned in order to obtain more details, possibly via a link directly integrated in the entries of the web feed.

The main web feed standards are known by the terminology RSS, standing for "Really Simply Syndication" in the RSS 2.0 version, and Atom (RFC 4287 of the IETF).

FIG. 1a shows an example of an RSS feed in which an entry <item> (corresponding to a content element) comprises a title <title>, a link <link> (the address at which the resource can be consulted), a description <description>, a publication date <pubDate> and an identifier <guid>.

FIG. 1b shows an example of a web feed according to the competing format Atom, in which the presence is observed, within an entry <entry>, of a title <title>, a link <link>, an identifier <id>, a date of updating <updated> and a summary <summary>. The Atom format was developed to solve certain problems inherent in the RSS format, in particular concerning the data contained, the type of which can be indicated with Atom, or vis-á-vis content management in several languages.

In order to guarantee an effective consultation of the entries of the feeds and not to overload the users with an excessive amount of information, these web feeds generally contain a limited number of entries. For example, with a limit of 20 entries, the web feed in question contains the last 20 elements of published contents.

In the mechanisms currently used, the updating of the web feed consists of adding new entries corresponding to the content elements to be published (those that have never been inserted in the web feed) as soon as these are available.

This is particularly the case with blog platforms. Some options do however make it possible to define a date or a frequency at which the new blog articles must be published in the RSS feed.

However, it is usual, in some cases, for the content elements to be published to become available at an irregular rate, in which case it may happen that the number of content elements to be published in the web feed exceeds the number of entries forming this feed.

In our example, even if there are 100 new content elements to be published, only 20 can be described in the web feed. With the conventional mechanisms, the feed will therefore describe only the last 20 content elements, the first 80 elements for their part not appearing in the web feed.

Likewise, in the case where these 100 content elements to be published are obtained in a short interval of time (for example one new element each minute), even if all the elements are at one moment described in the feed, the period during which they will be visible in the feed will be short (here 20 minutes). This visibility period may be deemed insufficient: this is because, in many cases, the frequency of consultation of a web feed by a user is generally substantially less (for example once or twice per day) than this visibility frequency.

In both cases, the result is therefore that the first 80 content elements do not have good visibility.

There therefore exists a need to improve, through the web feeds, the visibility of new content elements to be published that are created at an irregular rate.

The present invention addresses the drawbacks of the prior art and in particular responds to this requirement.

SUMMARY OF THE INVENTION

For this purpose, the invention concerns in particular a method of generating a web feed composed of entries corresponding to content elements, the method comprising the steps consisting of:

a. determining a number of content elements to be added to a web feed according to a number of content elements to be published that are available and according to a predefined visibility period associated with said web feed, b. selecting said number of content elements from said content elements to be published, and c. creating, in said web feed, entries corresponding to said selected elements.

The invention makes it possible to select content elements to be added effectively in the feed, these elements to be added being a subset of the set of content elements to be published available. The elements available are the new content elements corresponding to the elements never inserted in the feed and that are available to be so inserted.

The visibility period defines a minimum period during which it is wished for each content element to appear in the web feed. The first determination of the content elements to be published in the feed can define an initial instant. Next, the time from this instant is measured, and, at each multiple of the visibility period, it is possible to repeat the determination step. Thus it will be possible for example to carry out the determination each day at midnight.

According to the invention, the number of elements to be added is adapted according to the entry rate, that is to say all the elements available at this instant plus the future ones that depend on the visibility period defined (and will therefore arrive during this period). Thus the future traffic is anticipated for best adjusting the additions. Thus the invention makes it possible not to insert necessarily all the content elements to be published, some being able to be put on one side for insertion during the following period without any significant drawback for the user.

By adjusting the number of elements inserted periodically during a visibility period, the invention makes it possible to regulate the irregular creation of the content elements, while affording better visibility or exposure of these elements during this period.

The invention applies in particular to the contents, an immediate publication of which via the web feed is not necessary. This is because, though it is preferable for a site dealing with news to publish information reaching it as quickly as possible, this is not necessary for a site on which background articles are published, nor for a site on which a person publishes his photographs.

In the majority of cases, an entry is created for each of the content elements selected. However, in one embodiment, the method comprises a step consisting of grouping said element selected in subgroups, and a step of adding, to said web feed, one entry per subgroup thus formed. By virtue of this grouping, a single entry of the web feed is used for inserting the information relating to several content elements to be published. This arrangement makes it possible to regulate the insertion of the content elements to be published whereas the number of the latter may prove to be occasionally very high.

In particular, said grouping of the elements depends on a priority criterion associated with each of said elements. In this way it is possible to favor certain contents, the broadcasting of which via the web feed must be as immediate as possible. In particular, at least two subgroups are created according to the priority criterion, and the method comprises a step of determining a number of entries to be created in said web feed for each of said subgroups.

In a variant or in combination, said grouping of the elements depends on a time criterion of creation of said elements. This arrangement relies on the fact that two content elements close in time have high chances of being close in terms of content. In this way substantially thematic groupings are obtained that facilitate visibility for the subscriber.

In particular, a division of said group is iterated at the longest time interval separating two consecutive elements, recursively on a group composed of elements ordered according to a time criterion, so as to form a predefined number of subgroups. The predefined number of subgroups generally corresponds to the number of new entries to be created in the web feed to be generated. This embodiment is particularly simple to implement.

In a variant, it is also possible to proceed with groupings by content similarity, for example with regard to the key words, content element categories, etc.

According to a particular characteristic, the content elements to be published comprise attributes, and, for the creation of an entry of a subgroup, a set of attributes to be kept in said entry is determined according to the number of content elements constituting said subgroup. It is thus possible to adjust the quantity of information inserted in each entry according to a number of elements, in order to limit the size of these and that of the web feed.

In one embodiment of the invention, said determination of a number of content elements comprises a calculation of a number guaranteeing a predetermined maximum of elements not selected from said new elements. The regulation according to the invention thus makes it possible to spread the insertion of the contents over several visibility periods, while avoiding overload for the following periods.

In particular, said determination of a number of elements comprises the estimation of a number of new elements to be published liable to arrive during said visibility period. In this case, it is possible to add it to said number guaranteeing a maximum. The number of content elements to be published that will have to be processed during the following visibility period is then anticipated, limiting this to the maximum previously predefined.

And in particular, provision is made for estimating a predicted number of new elements liable to arrive during said visibility period, from historical data of said web feed representing statistics of arrivals, during the past visibility periods, of content elements to be published. This is because knowledge of the history of previous updates of the web feed makes it possible to know whether or not it is probable that more new content elements to be published are supplied in the near future. According to this provision, the regulation is therefore adapted taking account of this knowledge.

In one embodiment of the invention, the selection step comprises a prior step of sequencing said elements to be published, and said selection is made in the resulting order of the elements to be published. It is thus possible to favor certain contents, for example contents more recent than some others to be added to the web feed (the less recent available contents being potentially waiting for insertion in the feed for a longer time), but where it is wished for them to be added rapidly. Thus, by way of example, if a feed describes the photographs of a user, this user may wish to favor photographs in relation to a certain piece of news (birthday of a relative, an event that he has attended, etc) compared with holiday photographs.

In particular, in a similar fashion to the grouping of the elements mentioned previously, it is possible to provide for the said sequencing to depend on priority information associated with each of said content elements to be published.

As a variant or in combination, said sequencing depends on a time criterion relating to the creation of said content elements to be published. This provision makes it possible in particular to favor the broadcasting of a content within a reasonable time. In particular this time criterion can be applied secondarily for elements to be published having the same priority information.

According to one feature of the invention, the entries created are substituted for entries of a previous version of said web feed, and the number of entries created is strictly less than the number of entries of said web feed. In this way a constant number of entries are preserved in the web feed and at least one entry of the previous version of the feed. This preserved entry constitutes an indicator, for the subscriber to the feed, to know whether or not he has missed a previous version of said web feed.

In a variant of course, it is possible to substitute all the entries of the feed in order to provide a greater rotation of the number of content events.

In one embodiment of the invention, the entries created are inserted in said web feed at various instants distributed in said visibility period. It should be noted that the oldest entries or those with the lowest priority are generally removed at each insertion. This insertion broadcast over the period allows a more progressive change in the web feed.

Moreover, provision can be made for the method to comprise, subsequently to said selection, the reception of at least one new content element to be published with which first-priority information is associated, and the replacement, by said new content element received, of one of said selected elements not yet added to said web feed and with which information with a lower priority than the first priority is associated, possibly the lowest. Thus, by virtue of the diffuse insertion, it is possible to immediately insert any new element of a priority nature received in the interval (visibility period) without having to await the following period.

According to one feature of the invention, at least one so-called "available" entry in the web feed is kept during said addition of the entries and, during said visibility period, the available entry is replaced by a new entry describing a new priority content element received during this visibility period. Thus it is possible easily to update the web feed when a new priority element is received during the current visibility period.

According to another feature of the invention, after said visibility period has elapsed, steps a), b) and c) are reiterated on the non-selected content elements and the content elements newly received during said visibility period. This is because it may happen that new content elements are received during this period of time. In this case, the processing is applied once again to all the content elements to be published, including any newly received content elements.

If necessary, it is possible to extend said visibility period by a time less than a predetermined time, in order to proceed with the new iteration of the steps. This extension makes it possible to take into account new elements received in a regular fashion at the end of the visibility period.

In other words, the invention can concern a method of publishing content elements that comprise a first generation of a first version of the web feed according to the method described previously, and then the publication, during a first visibility period, of the said selected content elements, through the broadcasting of said web feed in this first version, and a second generation of a second version of the web feed from the content elements not selected during the first generation and content elements newly received during said first visibility period, and then the publication, during a second visibility period following on said first visibility period, of said content elements then selected, through the broadcasting of said web feed in this second version.

Concerning the reiteration of the steps, a predefined number of iterations of steps a), b) and c) is in particular performed, and the sum of the numbers of elements selected during said iterations is less than a predefined number for all the iterations. In this way a principal period (delimited by all the iterations) and secondary periods (each iteration) offering high reactivity (new additions during secondary periods) are created while guaranteeing visibility for the users during the principal period.

According to another feature of the invention, said determination and selection of elements are carried out on a first item of equipment, said content elements selected being transmitted from said first item of equipment to a web server, and said addition is carried out on said web server when said selected elements are received. This particular application makes it possible to regulate a web feed of a web server when the generation thereof is not controlled at this web server.

The invention also concerns a method of generating a plurality of web feeds comprising generating each of said web feeds as described previously, said web feeds having different associated visibility periods. In particular, the latter may be multiples of the shortest period: 1 day, 2 days, 1 week, etc. This makes it possible, for the same website, to make available several feeds with different refresh rates, according to the habits of the users. The invention then enables each of these web feeds to offer sufficient visibility for all the contents.

Correspondingly, the invention concerns a device for generating a web feed composed of entries corresponding to content elements, the device comprising:

a. a determination module adapted to determine a number of content elements to be added to a web feed, according to a number of content elements to be published and according to a predefined visibility period associated with said web feed, b. a selection means adapted to select said number of elements from said content elements to be published, and c. a creation means adapted to create, in said web feed, entries corresponding to said selected elements.

The device for generating a web feed has features and advantages similar to the generation method according to the invention.

Optionally, the device can comprise means relating to the features of the generation method disclosed previously.

An information storage means, possibly totally or partially removable, able to be read by a computer system, comprises instructions for a computer program adapted to implement the generation method according to the invention when this program is loaded into and executed by the computer system.

A computer program able to be read by a microprocessor comprises portions of software code adapted to implement the generation method according to the invention when it is loaded into and executed by the microprocessor.

The information storage and computer program means have features and advantages similar to the methods that they implement.

BRIEF DESCRIPTION OF THE DRAWINGS

Other particularities and advantages of the invention will also emerge from the following description, illustrated by the accompanying drawings, in which:

FIGS. 1a and 1b show two examples of a web feed respectively according to the RSS format and according to the Atom format;

DETAILED DESCRIPTION OF EMBODIMENTS OF THE INVENTION

Figure 2:
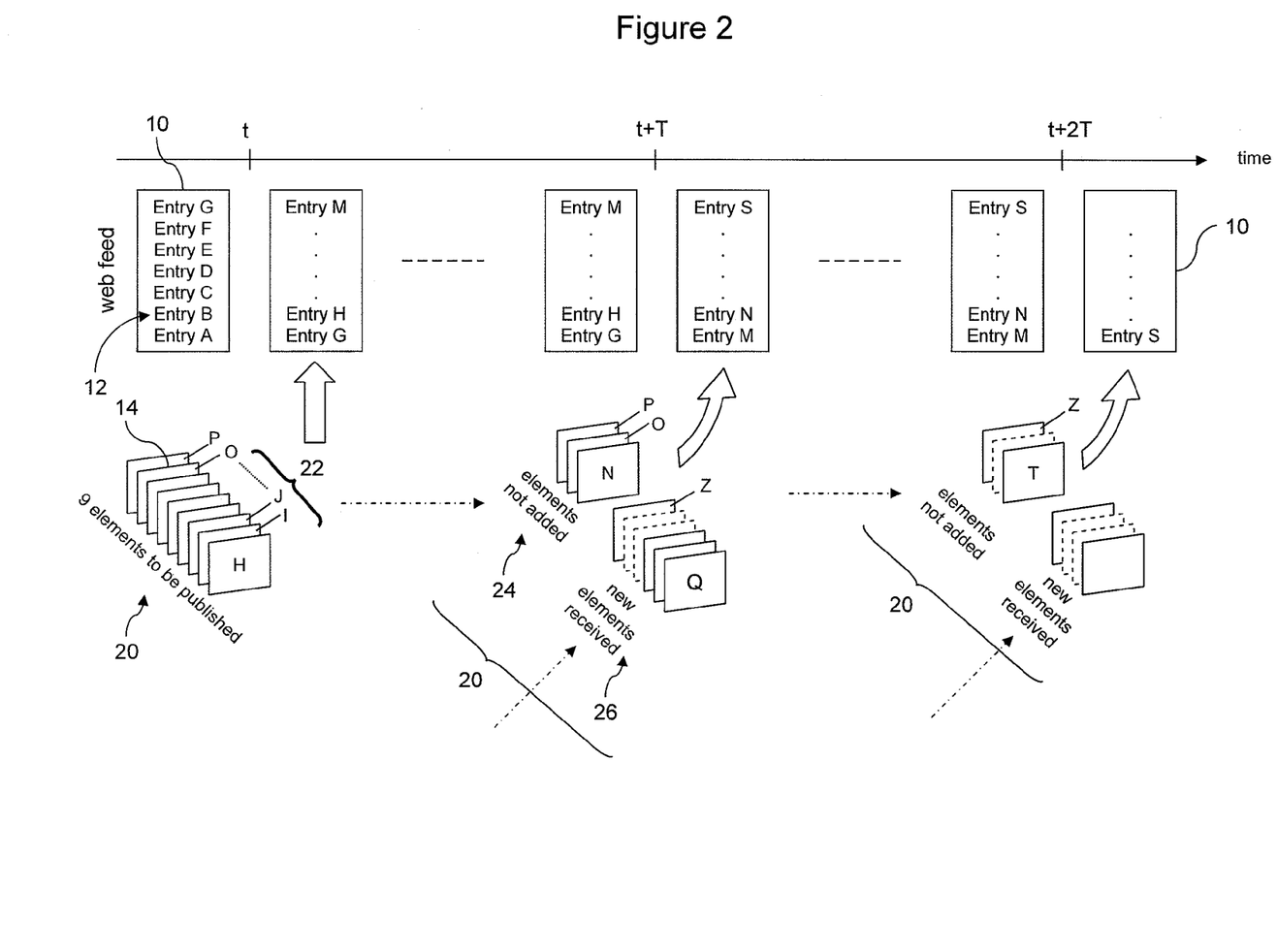
FIG. 2 illustrates an exemplary implementation of the present invention.

The invention is first of all illustrated by an example with reference to FIG. 2.

In this example, the web feed 10 consists of seven entries 12 denoted A to G, each entry representing a content element 14. At time t, there is also available a set 20 of nine content elements to be published, denoted H to P, which are to be added to the web feed 10. In this example, a visibility period T of one day is defined. This value is for example pertinent if it is considered that on average each person subscribing to the feed looks once a day.

In addition, the history of submission of content elements to be published shows that, when a large number of such content elements are received, new elements to be published are frequently received in the near future.

The number of elements 20 being greater than the number of entries 12 in the feed, it can be considered preferable to add a large number of these elements to the feed 10 since otherwise there is a risk of receiving new elements to be published, and then an overrun.

However, the number of elements to be published being simply slightly greater than the number of entries in the feed, it is not necessary to perform a grouping of elements. As illustrated below, the grouping of elements is used in the case where the number of elements to be published is appreciably greater than the number of entries.

In our example, although it is possible to choose seven elements to be published 20 to insert them in the feed (in which case all the entries of the feed will be renewed), it is chosen to renew six entries 12, keeping the most recent G. The latter enables the user consulting the feed to know whether he has missed some entries (having already seen this entry G, the user knows that he has missed nothing).

Next, the six elements to be published 22 that are the oldest among the new ones are selected, here the elements H-M, and then a new entry 12 is created for each of them by replacing the oldest entries A-F. In this way the web feed 10 broadcast during the period t1=[t; t+T] is obtained.

At the end of this selection and creation processing, there therefore remain three elements to be published 24, here the elements N-P, to be added to the feed. In the absence of new elements to be published obtained while the visibility period elapses, these three elements N-P are added as new entries at the end of a day (the visibility period).

On the other hand, if new content elements to be published 26 are obtained during this period, as illustrated here with the elements Q-Z, a new processing is set up to determine the number of elements to be selected, in order to select them and finally to create corresponding entries in the feed 10. The processing from one visibility period to the other may be different because in particular of the number of these elements to be published that can be selected and the priority character of some of these elements.

In the example in FIG. 2, entries corresponding to the elements to be published N-S are inserted in the feed 10 at t+T in order to be present in the feed during the visibility period t2=[t+T; t+2T]. The elements not selected are then T-Z and used during the modification of the feed at t+2T.

It is therefore found that, by virtue of the invention, the visibility of each content element is improved. Thus a user consulting the feed at least once per visibility period will not miss any element.

An embodiment of the invention is now described with reference to FIGS. 3 to 7.

A web feed 10 where the number of entries is limited to NEF entries, for example NEF=25, is considered first of all.

It should be noted however that the invention also applies to the case of a feed where the number of entries 12 is not limited, in which case it is possible, for the requirements of the invention, to arbitrarily set a value NEF on the basis of which the following processing operations will be performed, as described below.

The visibility period T is also set or determined. This period is defined in relation to the expected period of consultation of the feed 10 by the users of this feed.

It can in particular be set arbitrarily, for example T=24 hours, which enables a user consulting the feed 10 once per day to be certain that he does not lack any entry. It can in a variant be calculated from statistics on the average consultation frequency of the users, and therefore vary over time.

According to the invention as illustrated above with reference to FIG. 2, this visibility period T determines a minimum period during which the number of entries 12 added to the feed 10 does not exceed the limit NEF of the feed.

A maximum value (denoted MAX, of new entries 12 that can be added to the feed 10 during a visibility period T is also defined.

By definition, MAX must be less than or equal to NEF, without which it will not be possible to guarantee that a user consulting the feed once per period T will not lack an entry.

In addition, so that the user is certain not to have missed an entry, provision is made for preserving at least one common entry in the feed 10 during two successive visibility periods T. In our example in FIG. 2, MAX=NEF−1, this equation ensuring the preservation of at least one entry between two successive periods, while maximizing the number of new entries possible.

Figure 3:
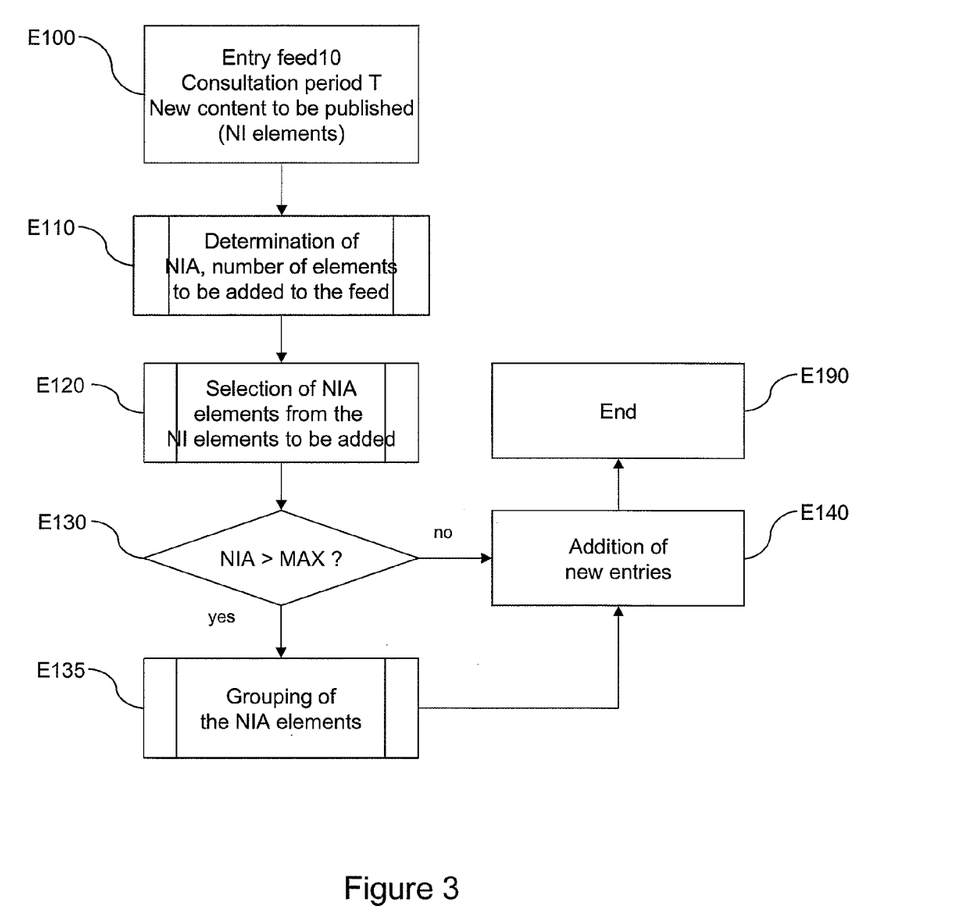
FIG. 3 shows, in the form of a flow diagram, general steps of generating a web feed according to the invention.

With reference now to FIG. 3, the general steps of controlled addition of elements in a web feed 10 for a visibility period T are described.

The process begins at step E100 with the obtaining of a web feed 10 composed of entries 12, a visibility period T and a set 20 of NI content elements to be published.

Optionally, information concerning the previous updates of the feed 10 is also obtained, in the form of a history of these updates for example. The use of such information is detailed below with reference to step E230 of FIG. 4.

The general processing continues at step E110 with the determination of the number of elements 20 to be added to the feed 10, a number denoted NIA. This step is detailed below with reference to FIG. 4.

Figure 5:
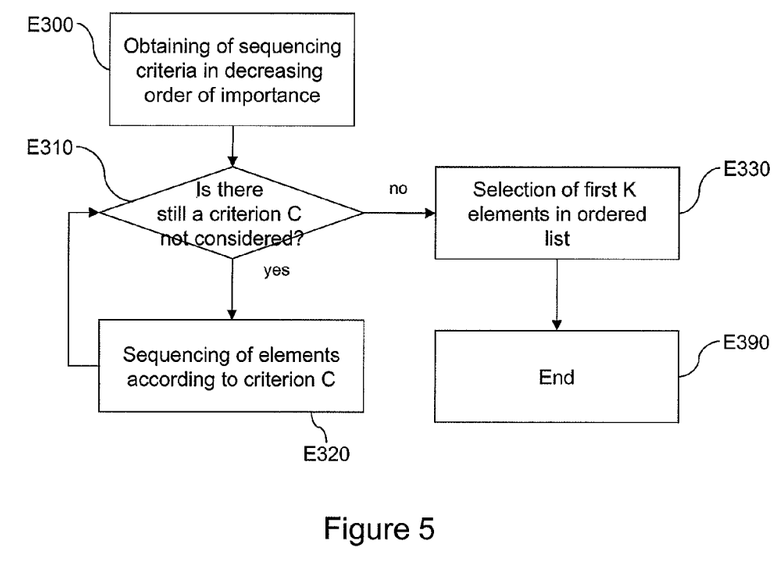
FIG. 5 shows, in the form of a flow diagram, steps of selecting content elements to be published, implemented during the generation of FIG. 3.

NIA being known, the NIA elements 22 to be added to the feed 10 are selected, among the NI available content elements to be published 20, during step E120 (detailed below with reference to FIG. 5).

If NIA is less that NI, the non-selected elements 24 are kept and will be added subsequently.

It is then assessed, at test E130, whether NIA is greater than the number MAX corresponding to the maximum number of entries that can be added to the feed 10 during the visibility period T.

In the affirmative, there exist more selected elements 22 to be added than entries 12 that can be created. Consequently, during step E135, detailed below with reference to FIG. 6, the NIA elements are grouped so as to obtain MAX entries.

In the negative (if NIA is not greater than MAX) or following step E135, new entries are created and added during step E140. As is known per se, the creation generally consists of filling the XML fields of the entry with the corresponding content information (<title>, <link>, <description>, <pubDate> and <guid> for example).

The processing then ends at step E190 and the web feed 10 thus created is transmitted during the visibility period T that follows.

Subsequently, any new content elements to be published 26 are received during the visibility period T. At the end of this, the method is repeated to process all the content elements to be published then available.

It should be noted that it is not strictly necessary to repeat the process at the exact expiry of the visibility period T but that the latter can be extended where necessary, for example by a maximum of T/10. This is because, if it is remarked that a peak of new elements is received just before the end of the period, it can be chosen to slightly delay the new implementation of the selection process, in order to continue to receive new elements regularly. In this way a maximum number of elements are taken into account during the next execution of the processing.

Figure 4:
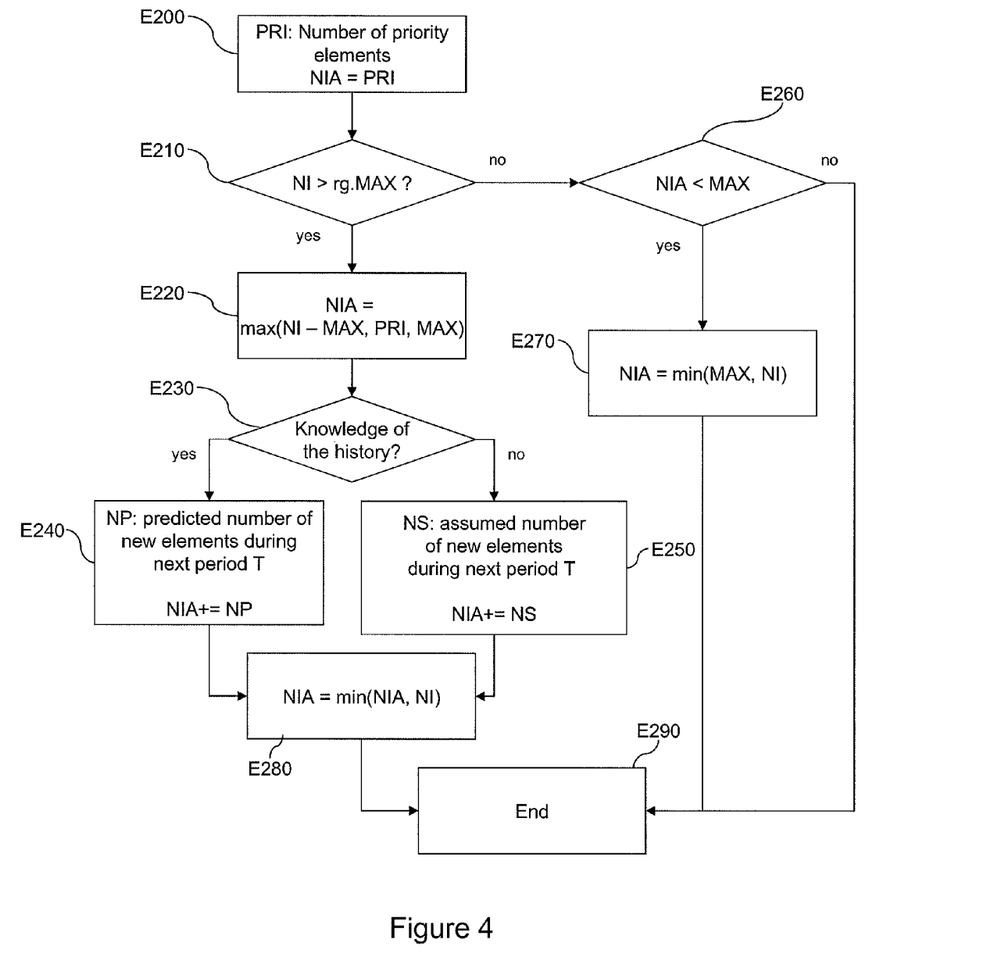
FIG. 4 shows, in the form of a flow diagram, steps of determining a number of content elements to be added to the web feed, implemented during the generation of FIG. 3.

With reference now to FIG. 4, step E110 of determining the number NIA of elements to be added to the feed 10 is described.

At step E200, the number NIA is initialized to the value PRI corresponding to the number of priority elements among the NI new elements. If there is no priority element, NIA is initialized to zero.

For this implementation, provision can be made to associate a priority level with the content elements. By way of example, two priority levels can be accepted to distinguish firstly the priority elements (to be inserted as a priority in the feed 10), and secondly the non-priority elements (added to the feed 10 once there is no more priority element to add).

The priority level can be a real property of the elements or be set manually by a user. In a variant, it can be derived from existing properties. Thus, if the case is taken where each element is a software update and each update is characterized by a criticality level, it can then be decided that the critical updates are seen as priority while the others are not.

Other more complex priority approaches can be used having a large number of possible priorities. Such priorities are calculated for each content element according for example to its age, its interest, its type of data, etc. A priority threshold, adjustable if necessary, makes it possible for example to distinguish the priority elements from those that are not.

The advantage of this initialization NIA of step E200 is to guarantee that all the priority elements are added during the first update of the feed 10 following the addition of these elements to the set 20 of elements to be published in the feed.

Next it is tested at step E210 whether the number NI of available elements to be published 20 is greater than rg.MAX, where rg is a group ratio parameter.

The purpose of this value "rg" is to define a limit to the number NI of elements, above which it is considered that there are too many elements to be added. In this case, provision is made for adding, to the feed 10, a large number of elements by means of the group of elements as described below with reference to FIG. 6 and at step E135. "rg" is defined strictly greater than 1.

In particular, if a value rg=2 is taken, when there are twice as many elements to be published 20 as the maximum number MAX of new entries added to the feed 10 during a visibility period T, groupings are carried out so as to increase the number of elements added having regard to the set number MAX of entries available, and therefore so as to avoid overrun.

In the affirmative at step E210, it is sought to set NIA so that the number of elements remaining to be added after the addition of the NIA elements is less than or equal to MAX. For this purpose, NIA can be taken=max(NI−MAX, PRI), which would be equivalent to adding, to the priority elements PRI, (NI−PRI−MAX) non-priority elements if ever PRI is less than NI−MAX.

In this case, the number of elements remaining to be added after the addition of the NIA elements is indeed less than or equal to MAX.

In addition, it should be noted that, in the case where the group ratio "rg" is greater than or equal to 2, NIA is greater than MAX, which necessarily implies the implementation of groupings (step E135).

However, if a value of "rg" of between 1 and 2 is taken, the value NIA may be less than MAX, which is not advantageous since it is possible to add MAX entries.

This why, at step E220, NIA=max(NI−MAX, PRI, MAX) is chosen.

At step E 230, it is determined whether there is knowledge of the history of the previous updates of the feed 10.

In the affirmative, the predicted number NP of new elements to be published that will be received during the next visibility period T is determined at step E240.

This number can be calculated in different ways from history information. Two examples are indicated here by way of illustration:
- simple mean of the number of new elements received during each previous period T;
- search, in the history, for situations similar to the current situation (similarity of pattern representing a series of consecutive elements, similarity of number of elements received, etc), and then examination and deduction of the number of new elements obtained during the following period T for each of these situations.

Once the predicted number NP is known, it is added to the number NIA. In this way, if NP new elements are obtained during the next visibility period T, anticipatory action is taken so that the number NI of elements to be published 20 during the next period is theoretically no more than MAX, so as to be able to add all these elements as new entries 12 in the feed 10 during the next update of the selection and addition processing according to the invention.

In a similar manner, if the history of updates of the feed is ignored (negative at step E230), a supposed number NS is added to NIA during step E250. This number NS is the supposed number of new elements to be published received during the next visibility period T: NS=f(T).

Unlike the predicted number NP, this supposed number NS is not determined from history information. NS may for example be set as a certain fraction of NEF, for example NEF/5 (if NEF is equal to 25, this means that it is assumed that there are five new elements per period T). This fraction can be adjusted if the period T is modified. It is also possible to take simply NS=0, in particular if it is assumed that the new elements arrive in a very irregular fashion.

At the end of steps E240 and E250, the minimum value between NIA and NI is allocated to NIA at step E280: NIA=min(NIA, NI). This step guarantees that the value NIA remains less than or equal to NI.

The process then ends at step E290.

In the negative at step E210 (NI is not greater than rg.MAX), it is assessed at step E260 whether the value NIA is less than MAX, that is to say whether there are fewer priority elements than there are entries 12 to be created. This is particularly the case if there is no priority element since, in this case, NIA is equal to 0.

In the affirmative, the value of NIA is changed at step E270 by choosing as a new value the smallest value between MAX and NI: NIA=min(MAX, NI), so as to allow the insertion of non-priority content elements to be published. Then the processing ends (step E290).

In the case where NIA is not less than MAX (negative at step E260, meaning that there are a number of priority elements greater than the number MAX), the processing ends directly (step E290), corresponding to the wish to add all the priority elements and only these.

It can therefore be seen that this determination of the number NIA is aimed at adding as many elements to be published 20 as possible during each period T. In particular, as soon as NI is greater than MAX, at least MAX elements are added, and if NI is less than MAX, then all the elements are added.

However, it should be noted that, depending on the values of MAX and "rg", substantially different behaviors are possible.

Thus, if MAX=NEF−1 is taken, and rg=2, it is possible to add, to the feed 10, a large number of elements 20 rapidly: during each period, if NI is greater than MAX, at least NEF−1 entries 12 are added, that is to say an almost complete renewal of the feed 10; where NI exceeds twice MAX, there are at a maximum MAX elements 20 that are not added, which means that at worst the elements are published during the second visibility period T after their reception. These parameters are suitable in particular when it is wished for a rapid publication of the content elements in the feed 10.

In contrast, if the following parameters are set: MAX=1 and rg=100, instead of very quickly adding the entries to the feed, it is probable that a certain number of elements will be stored during numerous periods T. For example, if 25 new content elements are received, then it will be necessary to wait for 25 periods before the latter is added to the feed 10. These parameters are thus suitable in the case where it is wished to have one new entry 12 during each period T.

According to the application sought, it is therefore possible to define differently the parameters (MAX, rg) involved in the choice of NIA. In addition, independently of the parameters MAX and rg mentioned, it is also possible to modify, in the case where the elements are grouped (step E135), the calculation of NI at step E220. In this case, the formula NIA=NI−MAX results in the addition of a large number of elements, but it may be wished to use a more progressive formula, for example NIA=MAX+(NI−rg. MAX)*ka, where ka is a positive constant less than or equal to 1. With such a formula, in the case where NI is equal to rg.MAX, MAX elements are added, as would be done (via steps E260 and E270) in the case where NI equals rg. MAX−1: therefore a form of continuity is ensured whatever the value of "rg".

Once the number NIA of elements to be added to the feed has been determined, it is necessary to proceed with the selection of these elements among the available content elements to be published 20. This operation, corresponding to step E120, is now described with reference to FIG. 5, where it is sought to select K (K generally equaling NIA except for certain variants described below) elements.

The selection begins with the obtaining, at step E300, of sequencing criteria in decreasing order of importance. The sequencing criteria considered can be chosen from a set composed of time data (date and time at which the element was created), priority information (priority element or not) or other element attributes (language of content element, type of content element, etc).

By way of example, as the first criterion the priority level can be taken and as the second criterion the time data (and in the absence of a priority level, the time data alone).

At step E310, it is determined whether there remains a criterion C not taken into account.

In the affirmative, the elements to be published 20 are sequenced according to the criterion C (step E320), and then step E310 is returned to in order to consider a following less important criterion. If there is more than one criterion C, then each criterion is not applied in an absolute fashion in order to sequence the list, but relative to the sequencing previously obtained, that is to say a criterion C2 acting after a criterion C1 will solely modify the sequencing of elements being equivalent for the criterion C1.

Thus, in the case where the two criteria in question are the priority level and the time data, therefore the elements to be published are sequenced so as to have first of all those where the priority level is high, and then those where the priority level is low, and next each of these two groups are sequenced according to the time information, the oldest element arriving first.

In the negative at step E310 (there no longer remains any criterion to be considered), the elements are sequenced, and it suffices to select the first K in the sequenced list.

The processing then ends at step E390.

Having available these NIA selected elements 22, a grouping can be carried out (E135) in order to satisfy the constraint of the MAX entries available, if NIA>MAX. This grouping thus aims to integrate, within at least the same feed entry 12, several selected content elements. This operation is now described with reference to FIG. 6, where it is sought to group the NIA selected elements 22 in NE entries (NE=MAX generally).

Figure 6:
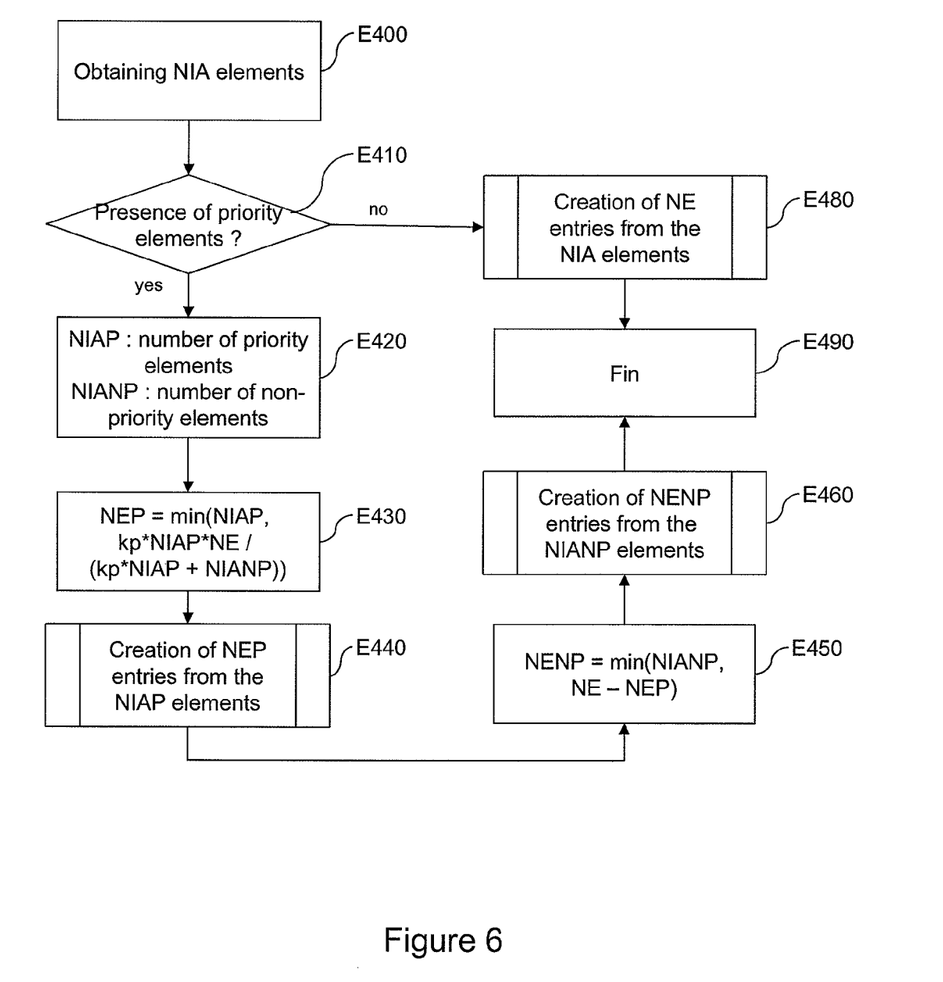
FIG. 6 shows, in form of a flow diagram, steps of grouping content elements to be published, implemented during the generation of FIG. 3.

The processing begins at step E400 with the obtaining of the NIA elements in question.

At step E410, it is determined whether priority elements are present among the NIA elements and whether the priority criterion is taken into account.

If not, the NIA elements are grouped in NE entries during step E480, described below with reference to FIG. 7, and the processing ends at step E490.

In the affirmative, the number NIAP of priority elements to be added, as well as the number NIANP of non-priority elements to be added, are counted at step E420.

According to these numbers NIAP and NIANP, a number NEP of entries 12 that will be used to describe the NIAP priority elements, as well as a number NENP of entries 12 that will be used for describing the NIANP non-priority elements, will then be determined. It is here sought to group the priority content elements together, and the non-priority content elements together also. Naturally, a larger number of priorities can be taken into account, and the method can then be adapted without difficulty.

For this purpose, a factor "kp" is defined, strictly greater than 1, which corresponds to the importance granted to the priority elements compared with the non-priority elements (and tending to group the priority elements to a greater or lesser extent). Typically, "kp" can take the value 3. This value is set for example by the person responsible for the publication of the contents.

Thus at step E430 the number NEP is determined by calculating for example the value kp*NIAP*NE/(kp*NIAP+NIANP) rounded to the higher integer. If this value is less than or equal to NIAP, then it is chosen as the value of NEP. Otherwise this means that there are potentially more entries than priority elements, and consequently NEP=NIAP is chosen. Thus, NEP=min(NIAP, ⌈kp*NIAP*NE/(kp*NIAP+NIANP)⌉) where ⌈x⌉ is the higher integer of x.

NEP entries are then created at step E440 from the NIAP priority elements, implementing the steps described below in relation to FIG. 7.

Next, at step E450, the value NENP=min(NE−NEP, NIANP) is determined.

Then, at step E460, NENP entries describing the NIANP non-priority elements are created, implementing the steps described below in relation to FIG. 7.

The processing then ends at step E490.

In some cases, the above formulae can result in a value of NEP equal to the number NE of entries to be created, although NIANP is non-zero. If it is wished to avoid being in this situation, it can be decided that, as from the moment when NIAP and NIANP are zero, the minimum value of NEP and NENP is equal to 1. In this case, it is decided that, if NEP and NE are equal at the end of step E430, NEP is decreased by 1; in this way, NENP will be equal to 1 rather than 0.

Figure 7:
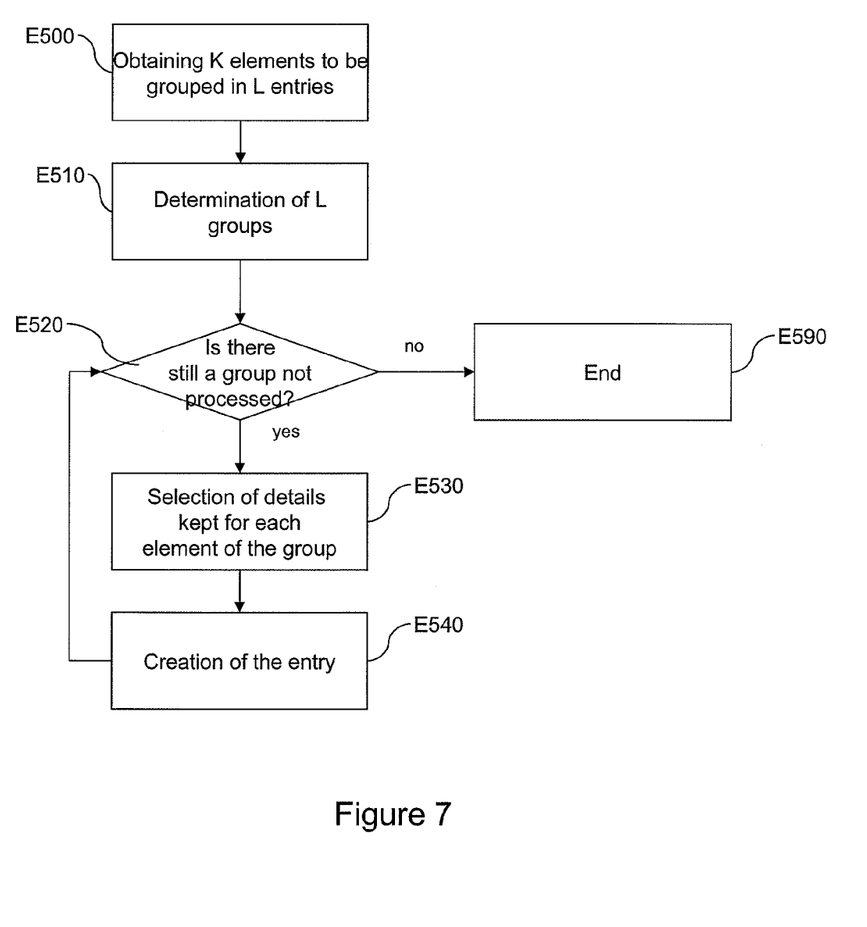
FIG. 7 shows, in the form of a flow diagram, steps of creating web feed entries from selected content elements, implemented during the generation of FIG. 3.

A description is now given, with reference to FIG. 7, of the creation of L entries 12 from K selected elements 26, in particular implemented during steps E440, E460 and E480 (respectively L=NEP, K=NIAP; L=NENP, K=NIANP; L=NE, K=NIA).

This begins at step E500 with the obtaining of the K elements to be grouped in L entries, K being greater than L.

L groups of elements among the K elements are then determined at step E510.

According to a first basic approach, each group can be defined as a succession of K/L elements (rounded to the higher integer); for example the first group being composed of the first to the ⌈K/L⌉$^{th}$ element, the second group of the ⌈K/L+1⌉$^{th}$ to the ⌈2K/L⌉$^{th}$ element, etc.

According to another approach, if dates and times of creation of the elements are available, groups are created that contain the elements that were created at times close together. This is because this correlation in time may signify a correlation in the content of the elements and therefore better visibility for the subscriber to the feed 10.

Ordered according to these dates and times of creation, the intervals of time between the creation of two consecutive elements are measured, then groups are created recursively by dividing a group into two at the largest interval (the starting group consisting of all the K elements). This is done L-1 times until L groups are obtained.

According to another approach, if for example keywords or categories associated with the K elements are available, a grouping is carried out by the same keywords or by similarity of category.

Once the groups are formed, a corresponding entry 12 designed to be added to the feed 10 is created for each of them.

For this purpose, at step E520, it is determined whether an unprocessed group remains.

If so, the details of the content element that it is necessary to preserve, for example the title, a summary and a publication date, are selected for each element making up the group (step E530).

This selection E530 involves two opposing considerations: on the one hand it is wished to preserve sufficient details to make each element visible, but on the other hand it is not wished to include too many details since it is important to preserve a feed 10 of reasonable size (and hence the limited number of entries 12). Consequently provision is made to adjust the level of details preserved according to the number of elements present in the group: if there are for example only two elements, then most of the details are kept (for example the title, the address at which the element can be consulted, but also the summary or comment or the description if such fields exist); on the other hand, if there are around ten elements, only the essential information is kept (for example the title and address at which this element can be consulted.

Once the details to be kept for each element of the group have been selected, the corresponding entry is created at step E540, this entry comprising all the details previously selected.

As for a conventional web feed entry 10, an entry describing a group of elements can for example have a title, a date of publication or updating, an identifier, or a link describing the address at which the resource can be consulted. However, since several elements exist in this single entry, logic is provided for describing these various elements in this single entry 12.

Concerning the title, it is possible for example to indicate the number of elements, as well as the title of one of the elements (the chosen element can then be termed principal—this choice can be based on properties of the element, for example a priority, a note chosen by the creator of the element, or a degree of age). In particular, if the nature of the elements (articles, photographs, videos etc) is known, it is possible to add, following one of the titles, the number of elements specifying their nature (for example "Eiffel Tower and ten other photographs") where the elements are photographs and one of the photographs has the title "Eiffel Tower").

Concerning the address at which the resource can be consulted, it is possible for example to choose the address of the principal element thus defined.

Next, in order to describe all the elements, it is possible to use the field/the tag <description> particular to an entry of an RSS feed, or the tag <content> in the case of an Atom feed. This is because it is possible to include different links in these fields, and in particular therefore to include a link to each element, as well as the title of each element.

As explained previously, if there are few elements (for example two), it can be sought to include more details (for example any summary or comment relating to the element). In the case of an Atom feed, it is also possible to add tags <link> with a "related" value attribute <rel>, and attributes <href> and indicating the addresses of the elements contained in this entry. This is because the purpose of these tags is to describe resources related to the entry.

After having created the entry 12 at step E540, step E520 is then returned to in order to process the following group. When there no longer remains an unprocessed group, the processing ends (step E590).

It can therefore be seen that this embodiment of the invention proposes a method for determining a number of content elements to be published at a web feed during a visibility period, a period during which other new content elements are received, and it is assumed that a user subscribing to the feed will consult this feed at least once, these content elements subsequently being selected from the content elements remaining to be published using a sequencing criterion.

In the case where the number of content elements to be published becomes too great, the invention makes it possible to group several content elements together in the form of a single entry in the web feed in question.

The result is an appreciable improvement in the visibility of content elements published by virtue of this regulation of their insertion in the web feeds.

Various applications of the regulation according to the invention are now presented.

In particular, it applies to the indirect control of the generation of a web feed by a website. This is because it is not always possible to control the generation of the web feed on the web server. For example, if a user has an account on a site providing an online photograph publication service that generates a web feed describing the last 25 photographs that he has sent, it is impossible for him to modify the web feed generator provided by this site.

Implementation of the invention may enable the user to regulate the sending of his photographs to the site and therefore the web feed generated. In this context, the user indicates for example a list of photographs and the information relating to his account on the photograph publication site, and the application is then responsible for sending these photographs to the site in a regulated manner: at each addition of a photograph, the web feed generator of the site updates the feed, and thereby the feed is indirectly regulated.

Nevertheless it should be remarked that, in such a case, the functionalities relating to the grouping of the elements to be published (here the grouping of several photographs in a single entry of the feed) can be provided, at best, only in a degraded manner. In particular, since the generation of the feed is not controlled, it is not possible to group distinct contents in a single entry, but only to merge these contents before sending them to the server (where they will then be seen only as a single content accessible at an address, rather than as a set of contents, each content having its own address).

In a variant, if several services are used (for example, one for the storage of contents, and one for the generation of the feed), the invention can be used to send the various items of information useful to each service in a coordinated manner.

Another application of the invention concerns the generation of several web feeds describing the same content.

As seen previously, one of the parameters taken into account by the invention is the visibility period T, corresponding to the period during which it is assumed that the subscribing user will consult the web feed. However, not all subscribers have the same consultation rate and some consult more frequently and others less frequently. For these, the parallel generation of several web feeds describing the same contents is provided, each feed corresponding however to a different consultation period.

It is thus possible to have, on a site, a feed the period T of which would be equal to one day, and another feed the period T of which would be two days, and a third the period T of which would be a week. By indicating to the users the period relating to each feed, they can then subscribe to the feed that best corresponds to their frequency of consultation. This provision distributes the contents of the week into seven daily periods for the feed with the shortest visibility period (and therefore potentially seven times more entries 12 than in the case of a period T equal to one week). This enables the user subscribing to this daily feed to access more detailed entries on each content element.

As mentioned previously, the visibility periods may be variable and take account for example of work constraints: if the web feed is for example not consulted at the weekend, there is no update on Saturday or Sunday.

The use of the invention in the context of the FeedSync extensions provided for the RSS and Atom formats is now described.

FeedSync extensions allow synchronization of various versions of a feed representing the same information. Thus, if an Atom feed is used to describe a collection of photographs, it may be that the feed is downloaded onto a portable computer or telephone. Once this feed is downloaded, some applications make it possible, from a given terminal, to display the collection of photographs without being connected to the internet, and to modify the collection by the addition or deletion of photographs for example.

In this case, the application will modify the feed locally, and FeedSync offers a way of describing the modifications made in order to allow possible subsequent synchronization with the web feed on the source server.

At the same time, it may happen that the feed present on the server is also modified, the modifications also being described with the FeedSync syntax, so that it is possible to synchronize the version of the feed present on the terminal of the user and the version present on the server.

On the other hand, if the local version and the version on the server are modified without using a common standard such as FeedSync, then it is particularly difficult, or even impossible, to synchronize the data.

In the context of the present invention, an apparatus that can be connected to a network and supports FeedSync is considered first of all.

For a given web feed 10 describing a set of contents, it is possible to modify the feed by addition, deletion or modification of contents.

These contents may represent a significant quantity of information (for example a set of photographs taken by means of a digital photographic apparatus); however, if they are described in a feed, it is because it is wished to share them. Consequently it proves useful to make these contents available, and therefore it is necessary to send them from the apparatus used to one or more other items of equipment (for example a web server).

The sending of this information, for apparatus with limited capacities, represents a not insignificant load, and it is preferable for the resulting processing not to prevent using the apparatus in question normally (for example, for a photographic apparatus, it is desirable that, even during the sending of the photographs, it is possible to continue to take other photographs). In a similar fashion, for some apparatus relying on a low-rate network, it is preferable not to use the entire bandwidth for the operation of sending the contents to be shared.

It should be noted here that at least two factors may lead to wishing to limit the quantity of data processed in such a scenario: the constraints of the apparatus used and those of the network.

Thus it is proposed to use the invention to limit the number of contents sent to another apparatus.

In this context, a period T is defined that may be relatively short (for example 2 minutes), and the number NIA of elements to be added (here photographs to be sent) is set according to the constraints of the apparatus and network.

In particular, it may be wished to limit the bandwidth used to read data in a memory (for example in photographic apparatus memory card, in order to be able to continue to use the photographic apparatus normally to take other photographs or to look at photographs previously taken).

Where the limitation relates to the memory, it is possible to use the average size of the contents and a maximum bandwidth permitted to determine NIA. With a short period T, it is possible to adjust NIA according to the use of the apparatus (in particular according to parallel network exchanges).

Figure 8:
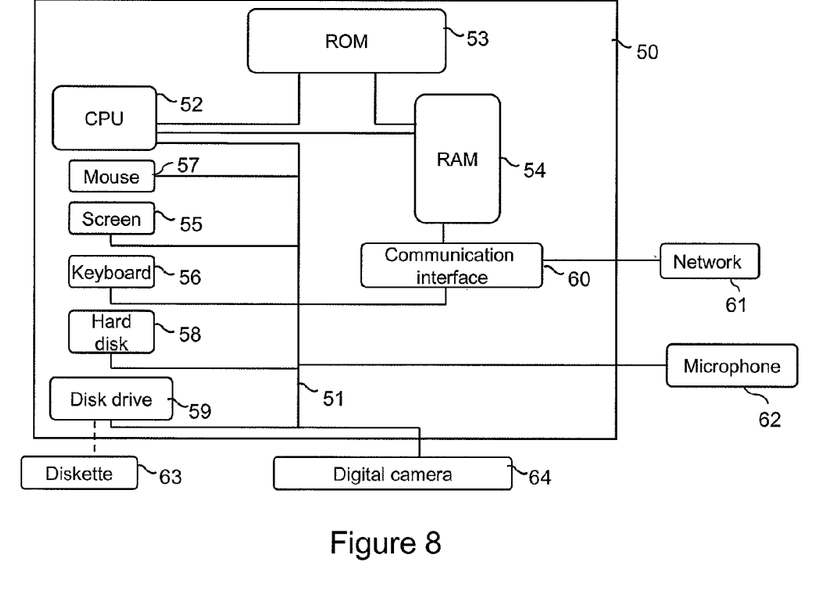
FIG. 8 shows a particular hardware configuration of a web feed generation device suitable for implementing the method according to the invention.

With reference now to FIG. 8, a description is given by way of example of a particular hardware configuration of a device or system for generating a web feed suitable for implementation of the method according to the invention.

An information processing device implementing the invention is for example a microcomputer 50, a workstation, a personal assistant, or a mobile telephone connected to various peripherals. According to yet another embodiment of the invention, the device is in the form of a photographic apparatus provided with a communication interface for allowing connection to a network.

The peripherals connected to the device according to the invention comprise for example a digital camera 64, or a scanner or any other image acquisition or storage means, connected to an input/output card (not shown) and supplying data to the device.

The device 50 comprises a communication bus 51 to which there are connected:
- a central processing unit CPU 52 for example in the form of a microprocessor;
- a read only memory 53 in which the programs the execution of which enables the method according to the invention to be implemented can be contained. This may be a flash memory or EEPROM;
- a random access memory 54, which, after the device 50 is powered up, contains the executable code of the programs of the invention necessary for implementing the invention. This random access memory 54 is of the RAM type (random access), which offers rapid access compared with the read only memory 53;
- a screen 55 for displaying data, in particular video, and/or serving as a graphical interface with a user, who can thus interact with the programs of the invention by means of a keyboard 56 or any other means such as a pointing device, such as for example a mouse 57 or an optical pen;
- a hard disk 58 or a storage memory, such as a memory of the compact flash type, able to contain the programs of the invention as well as data used or produced during implementation of the invention;
- an optional disk drive 59, or another reader for a removable data carrier, for receiving a diskette 63 and reading/writing thereon data processed or to be processed in accordance with the invention; and
- a communication interface 60 connected to the telecommunication network 61, the interface 60 being able to transmit and receive data, in particular for transmitting the web feed generated by the invention.

The communication bus 51 allows communication and interoperability between the various elements included in the device 50 or connected thereto. The representation of the bus 51 is not limitative and in particular the central unit 52 is able to communicate instructions to any element of the device 50 directly or by means of another element of the device 50.

The diskettes 63 can be replaced by any information carrier such as for example a compact disk (CD-ROM), rewritable or not, a zip disk or a memory card. In general terms, an information storage means able to be read by a microcomputer or a microprocessor, integrated or not into the web feed generation device, possibly removable, is adapted to store one or more programs the execution of which enables the method according to the invention to be implemented.

The executable code enabling the web feed generation device to implement the invention can be stored either in read only memory 53, on the hard disk 58 or on a removable digital medium such as for example a diskette 63 as described previously. According to a variant, the executable code of the programs is received by means of the telecommunication network 61, via the interface 60, in order to be stored in one of the storage means of the device 50 (such as the hard disk 58 for example) before being executed.

The central unit 52 controls and directs the execution of the instruction or portions of software code of the program or programs of the invention, the instructions or portions of software code being stored in one of the aforementioned storage means. When the device 50 is powered up, the program or programs that are stored in a non-volatile memory, for example the hard disk 58 or read only memory 53, are transferred into the random access memory 54, which then contains the executable code of the program or programs of the invention, as well as registers for storing the variables and parameters necessary for implementing the invention.

It should also be noted that the device implementing the invention or incorporating it can also be implemented in the form of a programmed apparatus. For example, such a device can then contain the code of the computer program or programs in a set form in an application specific integrated circuit (ASIC).

The device or system described here and, in particular, the central unit 52, are able to implement all or some of the processing operations described in relation to FIGS. 2 to 7, in order to implement the methods that are the subject matter of the present invention and constitute all or some of the systems that are the subject matter of the present invention.

The above examples are merely embodiments of the invention, which is not limited thereby.

In particular, the addition of new entries 12 in the web feed 10 at times t+n.T, with n integer and T the time elapsed since the initial instant, was described above.

In a variant however, the addition of the new entries 12, instead of being done on a single occasion, can be distributed over the whole of the visibility period T. Thus, if a set of NI elements to be added in form of NE entries is determined, it is possible to proceed with the addition of a new entry 12 every k.T/NE instants, k being an integer varying between 1 and NE.

In addition, in this variant, if priority content elements are received during the current period T, it is possible to replace one or more non-priority selected elements 20 not yet added with these new priority elements, so as to more quickly add the priority elements newly received.

An adaptation of this variant consists of selecting a subset of elements 20 on several occasions during the visibility period T so as to obtain NIA elements in total during the period T. On each occasion, only some of the MAX new entries possible are used (in proportion to the elements chosen from the NIS elements for example). By way of example, it may be a case of selecting NIA/3 elements on three occasions during the period T. In this case, it should be noted that, for the selection in FIG. 5, K=NIA/3 rather than NIA.

In another variant, it is chosen to reserve N entries from the MAX entries available in the period T, for N possible updates made during this period T: for example, two entries for two possible updates at T/3 and 2T/3. Each of these entries reserved is then intended to describe the priority elements received since the last update of the feed.

If no priority element has been received since the last update, the potentially available entry is not used. This is the reason why it is necessary to correctly size the number of entries reserved for the intermediate updates. In practice, MAX-N new entries are inserted, therefore keeping the N+1 most recent entries of the previous version of the feed 10 (the "+1" coming from the fact that NEF=MAX+1). The potentially available entry therefore corresponds to an entry already existing in the previous version of the feed. This entry is therefore replaced, where necessary, when a new priority content element is received.

Finally, in another variant, a principal period TP is defined, a secondary period TS, where TP=k.TS (k integer, for example TP=24 h and TS =1 h), and a maximum number MAX_TP of entries that can be added during the principal period TP is defined, as well as a maximum number MAX_TS of entries that can be added during each secondary period TS.

The invention is then applied for the secondary period TS and the maximum number of entries MAX_TS added during this period, but also taking account of the fact that more than MAX_TP entries must not be added during the period TP.

The advantage of this variant stems from the fact that it makes it possible to publish the elements received with better reactivity (period TS) while guaranteeing that a user complying with the consultation frequency TP will not miss any entry.

It should be noted however that there exists a risk, in this case, of unbalancing the number of elements described by each entry, throughout the principal period TP. This is because it may happen that, during the first periods TS, few content elements to be published are available and are each described with a consistent number of entries 12 (for example one entry per content element). Then it may happen that, during the following periods, a large number of new elements are received whereas the number of entries that can still be created remains limited. In this case, large groupings must take place and the content elements are described very succinctly, making them less visible to the subscriber.

It is possible to anticipate such a situation by forcing groupings during first periods TS of the principal period TP, and then relaxing this grouping constraint the more the last secondary periods TS are approached.

The invention claimed is:

1. A method of generating a web feed composed of content elements, comprising:
    a. determining a number of content elements to be added to the web feed, according to a number of available content elements to be published and according to a predefined visibility period associated with said web feed and defining a minimal time period for which any content element has to remain present in the web feed, wherein the determining of the number of content elements comprises estimating a predicted number of new content elements liable to arrive during said visibility period, from historical data of said web feed representing statistics of arrivals, during past visibility periods, of content elements to be published, and comprises using the predicted number to adjust the number of content elements to be added to the web feed;
    b. selecting from said number of available content elements to be published, the determined number of content elements; and
    c. creating, in said web feed, entries corresponding to said selected content elements.

2. The method according to claim 1, further comprising grouping said selected content elements in subgroups, and adding to said web feed one entry per subgroup thus formed.

3. The method according to claim 2, wherein said grouping of said content elements depends on a priority criterion associated with each of said content elements.

4. The method according to claim 2, wherein said grouping of said content elements depends on a time criterion of creation of said content elements.

5. The method according to claim 2, wherein the content elements to be published comprise attributes, and, for the creation of an entry of a subgroup, a set of attributes to be kept in said entry is determined according to the number of content elements constituting said subgroup.

6. The method according to claim 1, wherein said determining the number of content elements comprises calculating a number guaranteeing a predetermined maximum of non-selected content elements among said new content elements.

7. The method according to claim 1, wherein said selecting comprises a prior step of sequencing said content elements to be published, and said selection is operated in the resulting order of the content elements to be published.

8. The method according to claim 7, wherein said sequencing depends on priority information associated with each of said content elements to be published.

9. The method according to claim 7, wherein said sequencing depends on a time criterion relating to the creation of said content elements to be published.

10. The method according to claim 1, wherein the entries created are substituted for entries of a previous version of said web feed, and the number of entries created is strictly less than the number of entries of said web feed.

11. The method according to claim 1, wherein the entries created are inserted in said web feed at different instants distributed in said visibility period.

12. The method according to claim 1, further comprising, subsequent to said selecting, receiving at least one new content element to be published with which first-priority information is associated, and replacing, by said new content element received, one of said selected content elements, not yet added to said web feed and with which information with a lower priority than the first priority is associated.

13. The method according to claim 1, wherein, after said visibility period has elapsed, steps a), b) and c) are reiterated on the non-selected content elements and the content elements newly received during said visibility period.

14. The method according to claim 1, wherein a predefined number of iterations of steps a), b) and c) is performed, and the sum of the numbers of content elements selected during said iterations is less than a maximum number predefined for all the iterations.

15. The method according to claim 1, wherein said determining and selecting content elements are performed on a first item of equipment, said content elements selected being transmitted from said first equipment to a web server, and addition of the content elements is performed on said web server when said selected content elements are received.

16. A method of generating a plurality of web feeds, comprising:
    generating each of said plurality of web feeds according to the method of claim 1, wherein each of said web feeds having different associated visibility periods.

17. A method of publishing content elements, comprising:
    first generating a first version of a web feed according to the method of claim 1, and then publishing, during a first visibility period, said selected content elements, through the broadcasting of said web feed in this first version; and
    second generating a second version of the web feed according to the method of claim 1, from content elements not selected during said first generating and content elements newly received during said first visibility period, and then publishing, during a second visibility period following on said first visibility period, said content elements then selected, through the broadcasting of said web feed in this second version.

18. A non-transitory computer-readable medium, able to be read by a computer system, comprising instructions for a computer program which, when executed by a microprocessor or computer system in a device, causes the device to perform the method according to claim 1.

19. The method according to claim 1, wherein the predicted number is added to a current number of content elements to be added to the web feed to provide a new number of content elements to be added to the web feed.

20. A device for generating a web feed composed of content elements, comprising:

a processor and a memory;

a. a determination module constructed to determine a number of content elements to be added to the web feed, according to a number of available content elements to be published and according to a predefined visibility period associated with said web feed and defining a minimal time period for which any content element has to remain present in the web feed, wherein the determining of the number of content elements comprises estimating a predicted number of new content elements liable to arrive during said visibility period, from historical data of said web feed representing statistics of arrivals, during past visibility periods, of content elements to be published, and comprises using the predicted number to adjust the number of content elements to be added to the web feed;

b. a selection means constructed to select from said number of content elements to be published, the determined number content elements; and c. a creation means adapted to create, in said web feed, entries corresponding to said selected content elements.

21. The device according to claim 20, wherein the predicted number is added to a current number of content elements to be added to the web feed to provide a new number of content elements to be added to the web feed.

* * * * *